(12) United States Patent
Ihara et al.

(10) Patent No.: US 12,269,928 B2
(45) Date of Patent: Apr. 8, 2025

(54) RAW-MATERIAL SUPPLY SYSTEM AND RAW-MATERIAL SUPPLY METHOD

(71) Applicant: EBARA ENVIRONMENTAL PLANT CO., LTD., Tokyo (JP)

(72) Inventors: Takayuki Ihara, Tokyo (JP); Takashi Fujiwara, Tokyo (JP); Takeshi Mukai, Tokyo (JP)

(73) Assignee: EBARA ENVIRONMENTAL PLANT CO., LTD., Tokyo (JP)

( * ) Notice: Subject to any disclaimer, the term of this patent is extended or adjusted under 35 U.S.C. 154(b) by 0 days.

(21) Appl. No.: 18/290,905

(22) PCT Filed: Mar. 28, 2022

(86) PCT No.: PCT/JP2022/014963
§ 371 (c)(1),
(2) Date: Jan. 22, 2024

(87) PCT Pub. No.: WO2023/007856
PCT Pub. Date: Feb. 2, 2023

(65) Prior Publication Data
US 2024/0343882 A1 Oct. 17, 2024

(30) Foreign Application Priority Data

Jul. 28, 2021 (JP) .................. 2021-123636

(51) Int. Cl.
*C08J 11/12* (2006.01)
*C08J 11/16* (2006.01)
(Continued)

(52) U.S. Cl.
CPC .............. *C08J 11/12* (2013.01); *C08J 11/16* (2013.01); *C10G 1/008* (2013.01); *C10G 1/10* (2013.01);
(Continued)

(58) Field of Classification Search
CPC ........ C08J 11/12; C08J 11/16; C08J 2327/06; C08J 2367/02; C10G 1/008; C10G 1/10
See application file for complete search history.

(56) References Cited

FOREIGN PATENT DOCUMENTS

| JP | 2001-107058 A | 4/2001 |
|---|---|---|
| JP | 2001-114929 A | 4/2001 |

(Continued)

OTHER PUBLICATIONS

JP-2008095024A_English translation (Year: 2008).*
(Continued)

*Primary Examiner* — Youngsul Jeong
(74) *Attorney, Agent, or Firm* — Leydig, Voit & Mayer, Ltd.

(57) ABSTRACT

The present invention relates to a raw-material supply system and a raw-material supply method for pyrolyzing waste plastic including PVC and PET. The raw-material supply system includes: a slaked-lime supply device (12) configured to feed slaked lime to the waste plastic; an operation controller (15) configured to instruct the slaked-lime supply device (12) to feed the slaked lime to the waste plastic, the slaked lime to be fed having the number of moles that is 1 to 4 times a total number of moles of the polyvinyl chloride and the polyethylene terephthalate in the waste plastic; a melting dechlorination device (18) configured to dechlorinate the polyvinyl chloride and hydrolyze the polyethylene terephthalate by mixing the waste plastic and the slaked lime while heating the waste plastic and the slaked lime; a degassing hopper (20) coupled to the melting dechlorination device (18); and a raw-material supply device (22) configured to deliver the molten waste plastic from the degassing hopper (20) to a pyrolysis furnace (6).

10 Claims, 6 Drawing Sheets

(51) Int. Cl.
*C10G 1/00* (2006.01)
*C10G 1/10* (2006.01)

(52) U.S. Cl.
CPC ........ *C08J 2327/06* (2013.01); *C08J 2367/02* (2013.01)

(56) References Cited

FOREIGN PATENT DOCUMENTS

| JP | 2002179837 A | * | 6/2002 | ............. | C08J 11/16 |
|----|--------------|---|--------|---------------|------------|
| JP | 2004-269838 A | | 9/2004 | | |
| JP | 2008095024 A | * | 4/2008 | ............. | C08J 11/12 |
| JP | 2008133398 A | * | 6/2008 | ............... | C10G 1/10 |

OTHER PUBLICATIONS

JP-2002179837A_English translation (Year: 2002).*
JP-2008133398-A_English translation (Year: 2008).*
Japan Patent Office, International Search Report issued in International Application No. PCT/JP2022/014963 (Apr. 26, 2022).

* cited by examiner

RAW-MATERIAL SUPPLY SYSTEM AND RAW-MATERIAL SUPPLY METHOD

CROSS-REFERENCE TO RELATED APPLICATIONS

This patent application is the U.S. national phase of International Application No. PCT/JP2022/014963, filed Mar. 28, 2022, which claims the benefit of Japanese Patent Application No. 2021-123636, filed on Jul. 28, 2021, which are incorporated by reference in their entireties herein.

TECHNICAL FIELD

The present invention relates to a raw-material supply system and a raw-material supply method for pyrolyzing waste plastic containing polyvinyl chloride (PVC) and polyethylene terephthalate (PET), and in particular to a raw-material supply system and a raw-material supply method for supplying waste plastic to a pyrolysis furnace, while treating PVC and PET contained in the waste plastic.

BACKGROUND ART

Waste plastic includes PVC (polyvinyl chloride) and PET (polyethylene terephthalate), as well as PS (polystyrene), PP (polypropylene), and PE (polyethylene). Material recycling and chemical recycling for treating and reusing the waste plastic containing such various resin components have been developed. In particular, the chemical recycling, which recovers oil and gas from the waste plastic, has been attracting rising attention.

However, in order to conduct the chemical recycling on the waste plastic, it is necessary to treat PVC and PET for the following reasons.

When PVC (polyvinyl chloride) is pyrolyzed (or thermally decomposed), it generates HCl (hydrogen chloride), which may corrode downstream equipment. Moreover, a chlorine-containing compound may be mixed into a cracked oil recovered from the waste plastic, thus causing deterioration of quality of product oil.

PET (polyethylene terephthalate) generates benzoic acid and terephthalic acid when PET is pyrolyzed (or thermally decomposed) in a pyrolysis furnace. These acids have sublimation properties and may be deposited on downstream equipment, causing fouling and corrosion of the downstream equipment and deterioration of quality due to acid contamination (crystal precipitation) of cracked oil.

CITATION LIST

Patent Literature

Patent document 1: Japanese laid-open patent publication No. 2001-107058

SUMMARY OF INVENTION

Technical Problem

Patent Document 1 describes that slaked lime and waste plastic are supplied to a rotary kiln, and chlorine derived from PVC in the waste plastic is dechlorinated while the waste plastic is pyrolyzed. However, the waste plastic may often contain not only PVC but also PET. Therefore, when the waste plastic is treated, it is necessary to treat not only PVC but also PET. In particular, PVC contains phthalate ester (a main component of PET) as a plasticizer that has been added to PVC in order to make it flexible. As a result, the treatment aimed at either PVC or PET cannot achieve the intended chemical recycling.

Therefore, the present invention provides a raw-material supply system and a raw-material supply method capable of improving an efficiency of chemical recycling and capable of preventing fouling and corrosion of equipment by appropriately treating PVC and PET contained in waste plastic before sending the waste plastic to a pyrolysis furnace.

Solution to Problem

In an embodiment, there is provided a raw-material supply system for pyrolyzing waste plastic containing polyvinyl chloride and polyethylene terephthalate, the raw-material supply system comprising: a slaked-lime supply device configured to feed slaked lime to the waste plastic; an operation controller configured to instruct the slaked-lime supply device to feed the slaked lime to the waste plastic, the slaked lime to be fed having the number of moles that is 1 to 4 times a total number of moles of the polyvinyl chloride and the polyethylene terephthalate in the waste plastic; a melting dechlorination device configured to dechlorinate the polyvinyl chloride and hydrolyze the polyethylene terephthalate by mixing the waste plastic and the slaked lime while heating the waste plastic and the slaked lime; a degassing hopper coupled to the melting dechlorination device and configured to store the waste plastic that has been melted by the melting dechlorination device; and a raw-material supply device configured to deliver the molten waste plastic from the degassing hopper to a pyrolysis furnace.

In an embodiment, the raw-material supply system further comprises a weight measuring device configured to measure a weight of the waste plastic before the slaked lime is fed to the waste plastic, the operation controller being configured to adjust an amount of the slaked lime to be fed to the waste plastic based on a measured value of the weight of the waste plastic.

In an embodiment, the raw-material supply system further comprises a cracked-oil characteristic measuring device configured to measure a characteristic of a cracked oil recovered from a pyrolysis gas discharged from the pyrolysis furnace, the operation controller being configured to adjust an amount of the slaked lime to be fed to the waste plastic based on a measured value of the characteristic of the cracked oil.

In an embodiment, the cracked-oil characteristic measuring device is at least one of a chlorine-concentration measuring device configured to measure a concentration of chlorine in the cracked oil, an acid-concentration measuring device configured to measure a concentration of acid in the cracked oil, a pH measuring device configured to measure a pH of the cracked oil, and a pH measuring device configured to measure a pH of water separated from the cracked oil.

In an embodiment, the raw-material supply system further comprises a water scrubber configured to condense hydrocarbon vapor generated from the heated waste plastic to recover cracked oil, the water scrubber being coupled to the degassing hopper.

In an embodiment, the pyrolysis furnace comprises a pyrolysis furnace of a fluidized-bed furnace, the fluidized-bed furnace includes the pyrolysis furnace and a medium regeneration furnace containing a fluidized medium that circulates between the pyrolysis furnace and the medium regeneration furnace, the raw-material supply system further comprises a fluidized-medium transfer line configured to deliver a part of the fluidized medium from the medium regeneration furnace to the melting dechlorination device, and the part of the fluidized medium constitutes a heat source of the melting dechlorination device.

In an embodiment, there is provided a raw-material supply method for pyrolyzing waste plastic containing polyvinyl chloride and polyethylene terephthalate, the method comprising: feeding slaked lime to the waste plastic, the slaked lime having the number of moles that is 1 to 4 times a total number of moles of the polyvinyl chloride and the polyethylene terephthalate in the waste plastic; mixing the waste plastic and the slaked lime while heating the waste plastic and the slaked lime to dechlorinate the polyvinyl chloride and hydrolyze the polyethylene terephthalate; and supplying the waste plastic that has been melted by being heated to a pyrolysis furnace.

In an embodiment, the raw-material supply method further comprises measuring a weight of the waste plastic before the slaked lime is fed to the waste plastic, an amount of the slaked lime to be fed to the waste plastic being adjusted based on a measured value of the weight of the waste plastic.

In an embodiment, the raw-material supply method further comprises measuring a characteristic of a cracked oil recovered from a pyrolysis gas discharged from the pyrolysis furnace, an amount of the slaked lime to be fed to the waste plastic being adjusted based on a measured value of the characteristic of the cracked oil.

In an embodiment, the characteristic of the cracked oil is at least one of a concentration of chlorine in the cracked oil, a concentration of acid in the cracked oil, a pH of the cracked oil, and a pH of water separated from the cracked oil.

In an embodiment, the raw-material supply method further comprises condensing hydrocarbon vapor generated from the heated waste plastic by a water scrubber to recover cracked oil.

In an embodiment, the pyrolysis furnace comprises a pyrolysis furnace of a fluidized-bed furnace, the fluidized-bed furnace includes the pyrolysis furnace and a medium regeneration furnace containing a fluidized medium that circulates between the pyrolysis furnace and the medium regeneration furnace, a part of the fluidized medium is delivered from the medium regeneration furnace to the melting dechlorination device, and the part of the fluidized medium is used as a heat source of the melting dechlorination device.

Advantageous Effects of Invention

According to the present invention, the following effects can be obtained.

Since the slaked lime fed to the waste plastic has the number of moles that is 1 to 4 times the total number of moles of PVC (polyvinyl chloride) and PET (polyethylene terephthalate) in the waste plastic, appropriate dechlorination treatment of PVC and appropriate hydrolysis of PET are achieved. As a result, appropriate chemical recycling of the waste plastic can be achieved in the subsequent pyrolysis furnace. Furthermore, corrosion and fouling of equipment can be suppressed (reliability improved), and an improved yield of the cracked oil (mainly benzene) can be expected.

The amount of slaked lime to be fed to the waste plastic is automatically adjusted based on the weight of the waste plastic to be treated or the characteristic of the cracked oil recovered from the pyrolysis gas generated by the pyrolysis of the waste plastic in the pyrolysis furnace. The weight of PVC and PET in the weight of the waste plastic can be determined by examining the compositions of the waste plastic in advance. The characteristic (e.g., pH) of the cracked oil recovered from the pyrolysis gas may vary depending on the amount of the slaked lime that has been fed. Therefore, an appropriate amount of slaked lime can be fed to the waste plastic based on the information.

Hydrocarbon vapor generated from the heated waste plastic is condensed by the water scrubber and recovered as cracked oil. Therefore, a yield of the cracked oil is improved.

DESCRIPTION OF EMBODIMENTS

Embodiments of the present invention will be described below with reference to the drawings.

Figure 1:
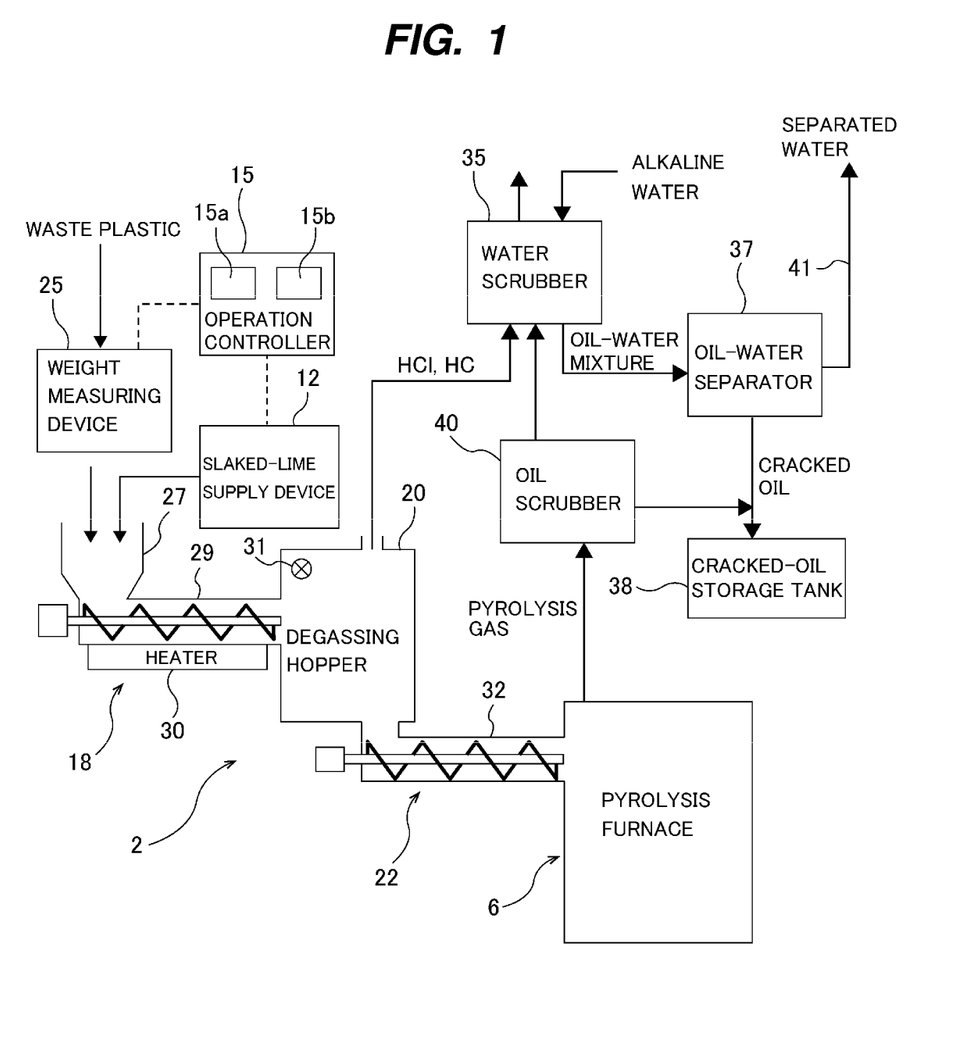
FIG. 1 is a schematic diagram illustrating an embodiment of a treatment system for treating waste plastic.

FIG. 1 is a schematic diagram showing an embodiment of a treatment system for treating waste plastic. The waste plastic to be treated includes at least PVC (polyvinyl chloride) and PET (polyethylene terephthalate). The waste plastic may further contain at least one of PS (polystyrene), PP (polypropylene), and PE (polyethylene).

As shown in FIG. 1, the treatment system includes a pyrolysis furnace 6 configured to pyrolyze the waste plastic and generate pyrolysis gas containing pyrolysis products, such as hydrocarbon, and a raw-material supply system 2 configured to supply the waste plastic to the pyrolysis furnace 6. The type of pyrolysis furnace 6 is not particularly limited, and may be, for example, a fluidized-bed pyrolysis furnace, which will be described later, or a kiln-type pyrolysis furnace.

The raw-material supply system 2 has not only a function of supplying the waste plastic to the pyrolysis furnace 6 but also a function of treating PVC and PET contained in the waste plastic before being supplied to the pyrolysis furnace 6. More specifically, the raw-material supply system 2 includes a slaked-lime supply device 12 configured to feed slaked lime to the waste plastic, and an operation controller 15 configured to instruct the slaked-lime supply device 12 to feed the slaked lime to the waste plastic, wherein the slaked lime to be fed has the number of moles that is 1 to 4 times a total number of moles of PVC (polyvinyl chloride) and PET (polyethylene terephthalate) in the waste plastic. The raw-material supply system 2 further includes a melting dechlorination device 18 configured to dechlorinate PVC and hydrolyze PET by mixing the waste plastic and the slaked lime while heating the waste plastic and the slaked lime, a degassing hopper 20 coupled to the melting dechlorination device 18 and configured to store the waste plastic that has been melted by the melting dechlorination device 18, and a raw-material supply device 22 configured to deliver the molten waste plastic from the degassing hopper 20 to the pyrolysis furnace 6.

The raw-material supply system 2 further includes a weight measuring device 25 configured to measure a weight of the waste plastic before the slaked lime is fed into the waste plastic. After the weight of the waste plastic as a raw material is measured by the weight measuring device 25, the waste plastic is fed into a raw-material hopper 27 of the melting dechlorination device 18. The weight measuring device 25 may be, for example, a weighing conveyor that can deliver the waste plastic while measuring the weight of the waste plastic. The weight measuring device 25 is coupled to the operation controller 15, so that a measured value of the weight of the waste plastic is sent to the operation controller 15. The operation controller 15 is configured to adjust (or determine) an amount of the slaked lime to be fed to the waste plastic based on the measured value of the weight of the waste plastic. The slaked-lime supply device 12 is coupled to the raw-material hopper 27 of the melting dechlorination device 18 and feeds the amount of slaked lime determined by the operation controller 15 into the raw-material hopper 27 of the melting dechlorination device 18. Therefore, the waste plastic (which is the raw material) and the slaked lime are fed into the raw-material hopper 27 of the melting dechlorination device 18. The location where the slaked lime is fed to the waste plastic is not limited to the raw-material hopper 27. For example, the slaked lime may be fed into a storage or conveyer for the waste plastic.

The operation controller 15 includes a memory 15a that stores programs therein, and an arithmetic device 15b configured to execute arithmetic operations according to instructions included in the programs. The memory 15a includes a main memory, such as a random access memory (RAM), and an auxiliary memory, such as a hard disk drive (HDD) or a solid state drive (SSD). Examples of the arithmetic device 15b include a CPU (central processing unit) and a GPU (graphic processing unit). However, the specific configurations of the operation controller 15 are not limited to this embodiment.

The melting dechlorination device 18 includes the raw-material hopper 27, a first raw-material feeder 29 coupled to the raw-material hopper 27, and a heater 30 configured to heat the first raw-material feeder 29. The waste plastic and the slaked lime fed into the raw-material hopper 27 are mixed by the first raw-material feeder 29 while being heated by the heater 30, and are sent to the degassing hopper 20. In one embodiment, the heater 30 is configured to heat the waste plastic and the slaked lime within a range of 250° C. to 350° C. The configuration and the arrangement of the heater 30 are not particularly limited as long as the heater 30 can heat the mixture of waste plastic and slaked lime within the range of 250° C. to 350° C. Specific examples of the heater 30 include a steam heater, an electric heater, and a heater using heated inert gas (e.g., nitrogen gas) as a heat source. The heating method of the waste plastic and the slaked lime may be either direct heating or indirect heating, or a combination thereof.

The melting dechlorination device 18 heats the mixture of waste plastic and slaked lime using the heater 30 to thereby dechlorinate PVC contained in the waste plastic. More specifically, chlorine contained in PVC is thermally decomposed as HCl (hydrogen chloride) when PVC is heated in the range of 250° C. to 350° C. The generated HCl is subjected to a dry treatment performed by the slaked lime, so that chlorine in HCl is fixed as Ca salt (CaCl$_2$) to the slaked lime. As a result, contact and reaction between chlorine and cracked oil in the pyrolysis gas generated in the subsequent pyrolysis furnace 6 can be avoided, and generation of organic chlorine compound can be reduced.

Furthermore, the melting dechlorination device 18 hydrolyzes PET contained in the waste plastic by heating the mixture of waste plastic and slaked lime with the heater 30. More specifically, the heater 30 heats PET together with the slaked lime in the range of 250° C. to 350° C. to thereby generate calcium terephthalate. This calcium terephthalate is pyrolyzed in the pyrolysis furnace 6. Therefore, production of benzoic acid and terephthalic acid, which are sublimation materials, is suppressed, so that the yield of cracked oil (especially benzene) is improved.

According to this embodiment, the slaked lime having the number of moles that is 1 to 4 times the total number of moles of PVC (polyvinyl chloride) and PET (polyethylene terephthalate) in the waste plastic is fed to the waste plastic, thus achieving both appropriate dechlorination treatment of PVC and appropriate hydrolysis of PET. As a result, appropriate chemical recycling of the waste plastic can be achieved in the subsequent pyrolysis furnace 6.

In this embodiment, the amount of slaked lime to be fed to the waste plastic is automatically adjusted by the operation controller 15 based on the weight of the waste plastic to be treated. The weight of PVC and PET in the weight of waste plastic can be determined by examining compositions of the waste plastic in advance. Therefore, the slaked-lime supply device 12 can feed an amount of slaked lime that can appropriately treat both PVC and PET in the waste plastic into the waste plastic, based on the instruction from the operation controller 15.

The weight of PVC and PET in the weight of the waste plastic is more specifically weight of chlorine and acid in the weight of the waste plastic. Therefore, the amount of slaked lime to be fed to the waste plastic is the amount necessary for treating chlorine and acid contained in the waste plastic. An example of the amount of slaked lime to be fed to the waste plastic will be described below.

(1) A case where the amount of PVC and PET in the waste plastic is known.

The amount of slaked lime per mole w (kg/H) is given by $$w = (W \times x/100 \times 0.57 \times 74/35.5/2) + (W \times y/100 \times 0.33 \times 74/16/4)$$

where a weight measurement value of the waste plastic is denoted by W (kg/H), a proportion of PVC is denoted by x (wt %), and a proportion of PET is denoted by y (wt %).

(2) A case where the amount of PVC and PET in the waste plastic is unknown.

The amount of slaked lime per mole w (kg/H) is given by $$w = (W \times \alpha/100 \times 74/35.5/2) + (W \times \beta/100 \times 74/16/4)$$

where a weight measurement value of the waste plastic is denoted by W (kg/H), a proportion of chlorine given by an elemental analysis result is denoted by $\alpha$ (wt %), and a proportion of oxygen given by the elemental analysis result is denoted by $\beta$ (wt %).

Molecular weight of each compound and atomic weight of each element are as follows.

PVC (skeleton): $(C_2H_3Cl)n$, molecular weight=62.5, proportion of chlorine in PVC=57 wt %

PET (skeleton): $(C_{10}H_8O_4)n$, molecular weight=192, proportion of oxygen in PET=33 wt %
Slaked lime: $Ca(OH)_2$, molecular weight=74
Atomic weight of chlorine: 35.5
Atomic weight of oxygen: 16

For example, if 1 mol of HCl is generated with respect to 1 mol of PVC by the pyrolysis, 0.5 mol of slaked lime $Ca(OH)_2$ is required for neutralization. Furthermore, if 2 moles of —COOH are generated with respect to 1 mole of PET by the hydrolysis, then 1 mole of slaked lime $Ca(OH)_2$ is required for neutralization.

The waste plastic is melted by being heated in the range of 250° C. to 350° C. by the melting dechlorination device 18. As a result, the molten waste plastic is uniformly mixed with the slaked lime, so that efficiency of PVC dechlorination and PET hydrolysis is improved.

The molten waste plastic is delivered to the degassing hopper 20 by the first raw-material feeder 29. The measured value of the weight measuring device 25 is sent to a drive unit of the first raw-material feeder 29, so that the first raw-material feeder 29 operates according to the measured value of the weight measuring device 25. In the degassing hopper 20, air existing in gaps in the waste plastic, gaseous HCl that was not fixed as Ca salt to the slaked lime, and hydrocarbon vapor are separated from the molten waste plastic. The melting of the waste plastic can allow the separation of the air from the waste plastic and can prevent the air from being supplied from the raw-material supply system 2 to the pyrolysis furnace 6. As a result, combustion of the waste plastic in the pyrolysis furnace 6 can be prevented, and the pyrolysis of the waste plastic can proceed. An inert gas (e.g., nitrogen) or steam may be introduced into the degassing hopper 20 so as to prevent the combustion of the waste plastic in the pyrolysis furnace 6.

The raw-material supply system 2 includes a level sensor 31 configured to detect a liquid level of the molten waste plastic stored in the degassing hopper 20. A measured value of the liquid level of the waste plastic is sent to the drive unit of the first raw-material feeder 29. The first raw-material feeder 29 operates so that the liquid level of the waste plastic in the degassing hopper 20 is within a predetermined range. The predetermined range include a lower limit level that ensures sealing between the pyrolysis furnace 6 and the degassing hopper 20 in consideration of pressure fluctuations within the pyrolysis furnace 6, and an upper limit level at which the molten waste plastic does not exceed the volume of the degassing hopper 20.

The raw-material supply device 22 includes a second raw-material feeder 32 configured to feed the molten waste plastic in the degassing hopper 20 to the pyrolysis furnace 6. The second raw-material feeder 32 is configured to feed the waste plastic continuously or intermittently to the pyrolysis furnace 6. The waste plastic that has been treated by the raw-material supply system 2 is pyrolyzed in the pyrolysis furnace 6 to generate pyrolysis gas.

The raw-material supply system 2 further includes a water scrubber 35 configured to condense the hydrocarbon (HC) vapor, which has been generated from the waste plastic heated by the melting dechlorination device 18, to recover cracked oil. The water scrubber 35 is coupled to the degassing hopper 20. The hydrocarbon (HC) vapor generated from the molten waste plastic in the degassing hopper 20 and the hydrogen chloride that was not fixed to the slaked lime are delivered to the water scrubber 35. The water scrubber 35 sprays water (alkaline water in this embodiment) onto the hydrocarbon (HC) vapor and the hydrogen chloride gas passing through the water scrubber 35. The hydrocarbon (HC) and hydrogen chloride in the water scrubber 35 contact the water, so that the hydrogen chloride (HCl) is neutralized, and the hydrocarbon (HC) vapor is condensed to form the cracked oil.

Mixture of the cracked oil and the water is discharged from the water scrubber 35 and sent to an oil-water separator 37. The oil-water separator 37 is configured to separate the cracked oil from the water. Although specific configuration of the oil-water separator 37 is not particularly limited, the oil-water separator 37 may be a coalescer or a settling tank. The cracked oil separated by the oil-water separator 37 is delivered to a cracked-oil storage tank 38 and stored therein. The water separated from the cracked oil by the oil-water separator 37 is delivered to a wastewater treatment device (not shown) through a separated-water discharge line 41.

As described above, according to the present embodiment, the hydrocarbon (HC) vapor generated from the waste plastic heated by the melting dechlorination device 18 is recovered as the cracked oil by the water scrubber 35, so that an overall yield of the cracked oil can be improved. Specific configuration of the water scrubber 35 used is not particularly limited, and any known water scrubber can be used. For example, the water scrubber 35 may be a cleaning tower that includes a tower having a gas passage formed therein and a spray nozzle that sprays water onto gas flowing through the gas passage.

In one embodiment, hydrocarbon gas containing HCl (hydrogen chloride) that has been generated in the degassing hopper 20 and was not fixed to the slaked lime may be introduced into a combustion furnace (not shown), and the hydrocarbon gas containing HCl may be subjected to a combustion treatment in the combustion furnace.

The water scrubber 35 is arranged downstream of an oil scrubber 40 described below. The oil scrubber 40 is coupled to the pyrolysis furnace 6. The pyrolysis gas generated in the pyrolysis furnace 6 is first delivered to the oil scrubber 40 and then to the water scrubber 35. The oil scrubber 40 cools the pyrolysis gas and condenses cracked oil (hydrocarbon) vapor in the pyrolysis gas by spraying the pyrolysis gas with cracked oil that has already been recovered from the pyrolysis gas or oil supplied from outside. Both the condensed cracked oil and the sprayed oil are discharged from the oil scrubber 40 and stored in the cracked-oil storage tank 38.

The pyrolysis gas discharged from the oil scrubber 40 is delivered to the water scrubber 35, where the pyrolysis gas is further cooled and the cracked oil remaining in the pyrolysis gas is recovered. In this manner, according to this embodiment, the pyrolysis gas that has been discharged from the pyrolysis furnace 6 is cooled in two stages: the oil scrubber 40 and the water scrubber 35. The oils obtained by the oil scrubber 40 and the water scrubber 35 have different distillation characteristics due to different cooling temperatures. For this reason, the oils obtained from the oil scrubber 40 and the water scrubber 35 may be stored separately.

The specific configuration of the oil scrubber 40 used is not particularly limited, and any known oil scrubber can be used. For example, the oil scrubber 40 may be a cleaning tower including a tower having a gas passage formed therein and a spray nozzle that sprays oil onto gas flowing through the gas passage.

Figure 2:
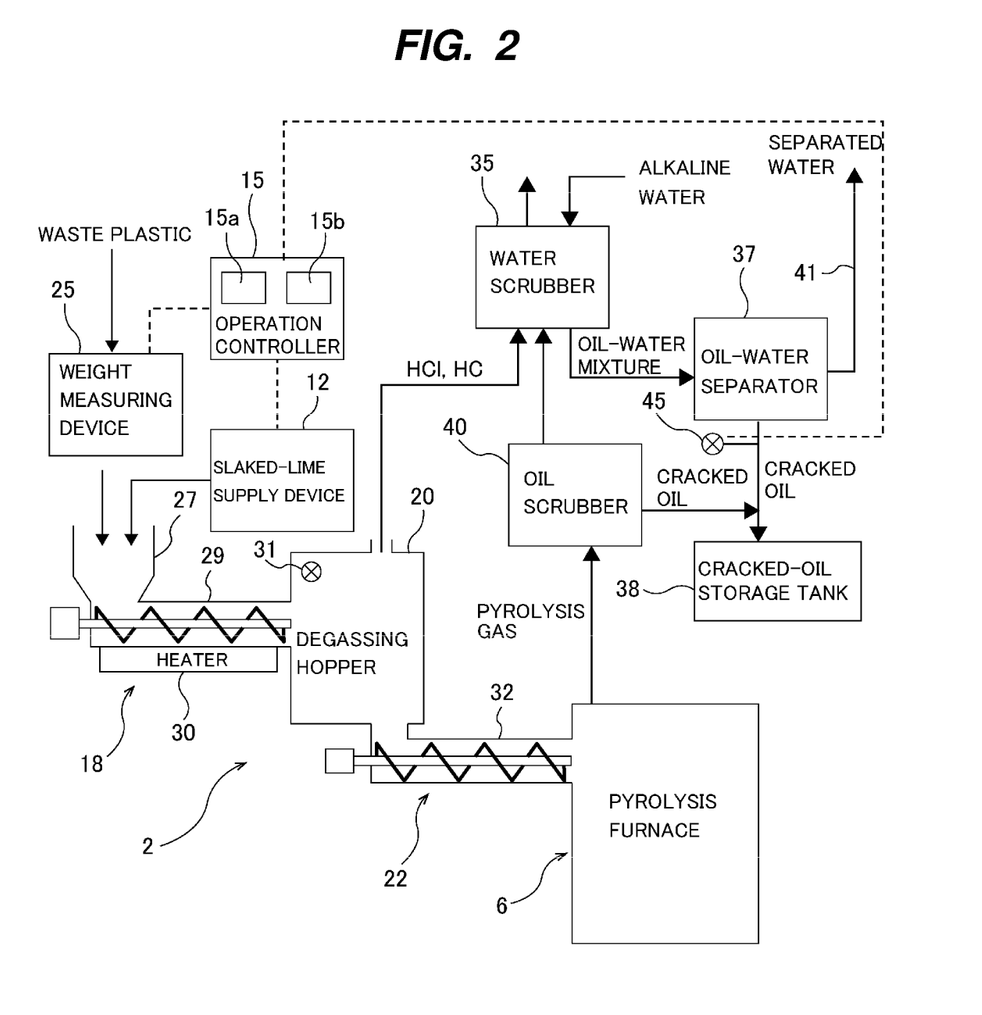
FIG. 2 is a schematic diagram illustrating another embodiment of a treatment system.

FIG. 2 is a schematic diagram showing another embodiment of a treatment system for treating the waste plastic. Configurations and operations of this embodiment, which will not be particularly described, are the same as those of the embodiments described with reference to FIG. 1, and repetitive explanations thereof will be omitted. In the embodiment shown in FIG. 2, the raw-material supply system 2 includes a cracked-oil characteristic measuring device 45 configured to measure a characteristic of the cracked oil recovered from the pyrolysis gas discharged from the pyrolysis furnace 6.

Figure 3:
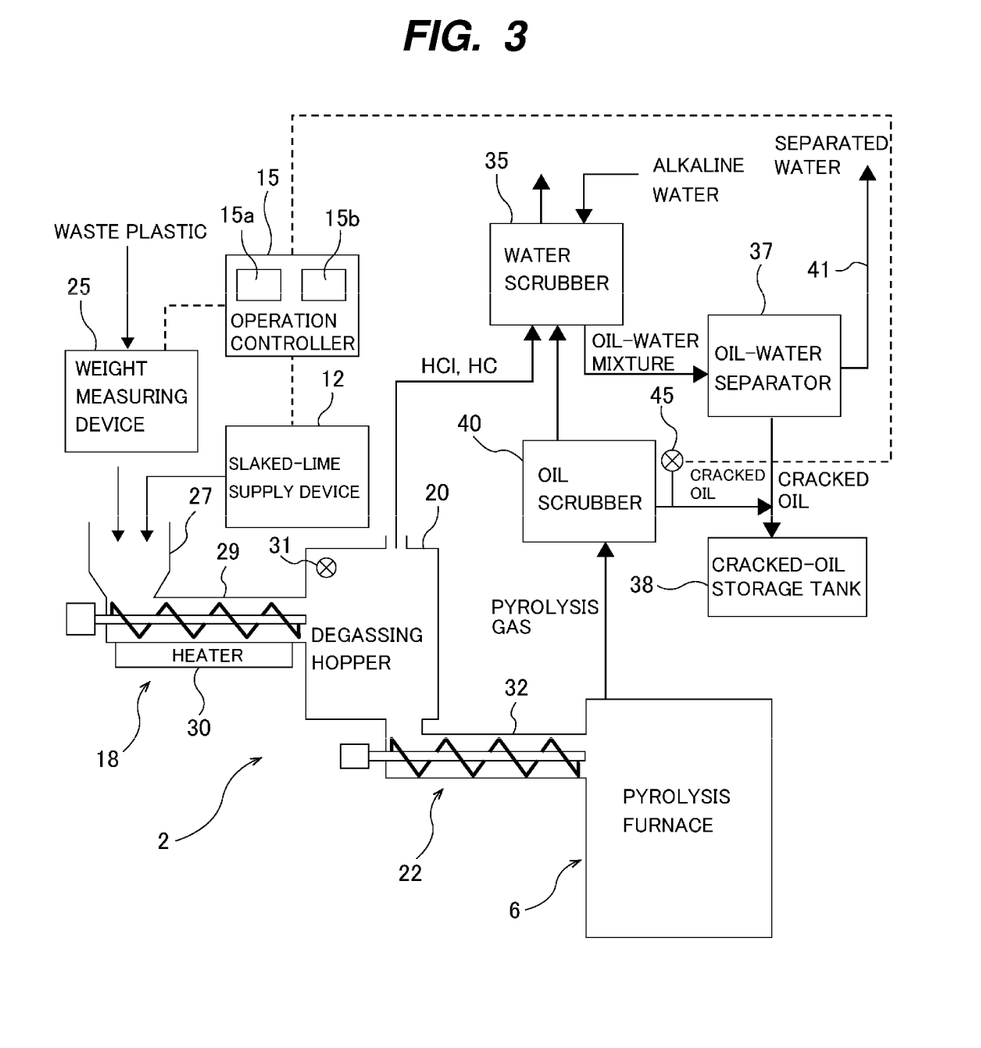
FIG. 3 is a schematic diagram illustrating yet another embodiment of a treatment system.

The cracked-oil characteristic measuring device 45 is disposed downstream of the water scrubber 35 and is configured to measure the characteristic of the cracked oil discharged from the water scrubber 35. More specifically, as shown in FIG. 2, the cracked-oil characteristic measuring device 45 is disposed downstream of the oil-water separator 37 configured to divide the oil-water mixture discharged from the water scrubber 35 into the cracked oil and the water. The cracked-oil characteristic measuring device 45 is coupled to a pipe extending from the oil-water separator 37 to the cracked-oil storage tank 38. In one embodiment, as shown in FIG. 3, the cracked-oil characteristic measuring device 45 may be disposed downstream of the oil scrubber 40 and may measure the characteristic of the cracked oil discharged from the oil scrubber 40.

Specific examples of the characteristic of cracked oil include a concentration of chlorine in the cracked oil, a concentration of acid in the cracked oil, pH of the cracked oil, and pH of water separated from the cracked oil. These characteristics of the cracked oil can vary depending on the amount of the slaked lime fed into the raw-material hopper 27 of the melting dechlorination device 18. For example, if the amount of the slaked lime is too large relative to the amount of PVC and PET in the waste plastic, the pH of the cracked oil recovered from the pyrolysis gas will be high. Therefore, an appropriate amount of the slaked lime can be fed to the waste plastic based on a measured value of the characteristic of the cracked oil. The characteristic of the cracked oil may be at least one of, or a combination of two or more of, concentration of chlorine in the cracked oil, concentration of acid in the cracked oil, pH of the cracked oil, and pH of the water separated from the cracked oil.

Figure 4:
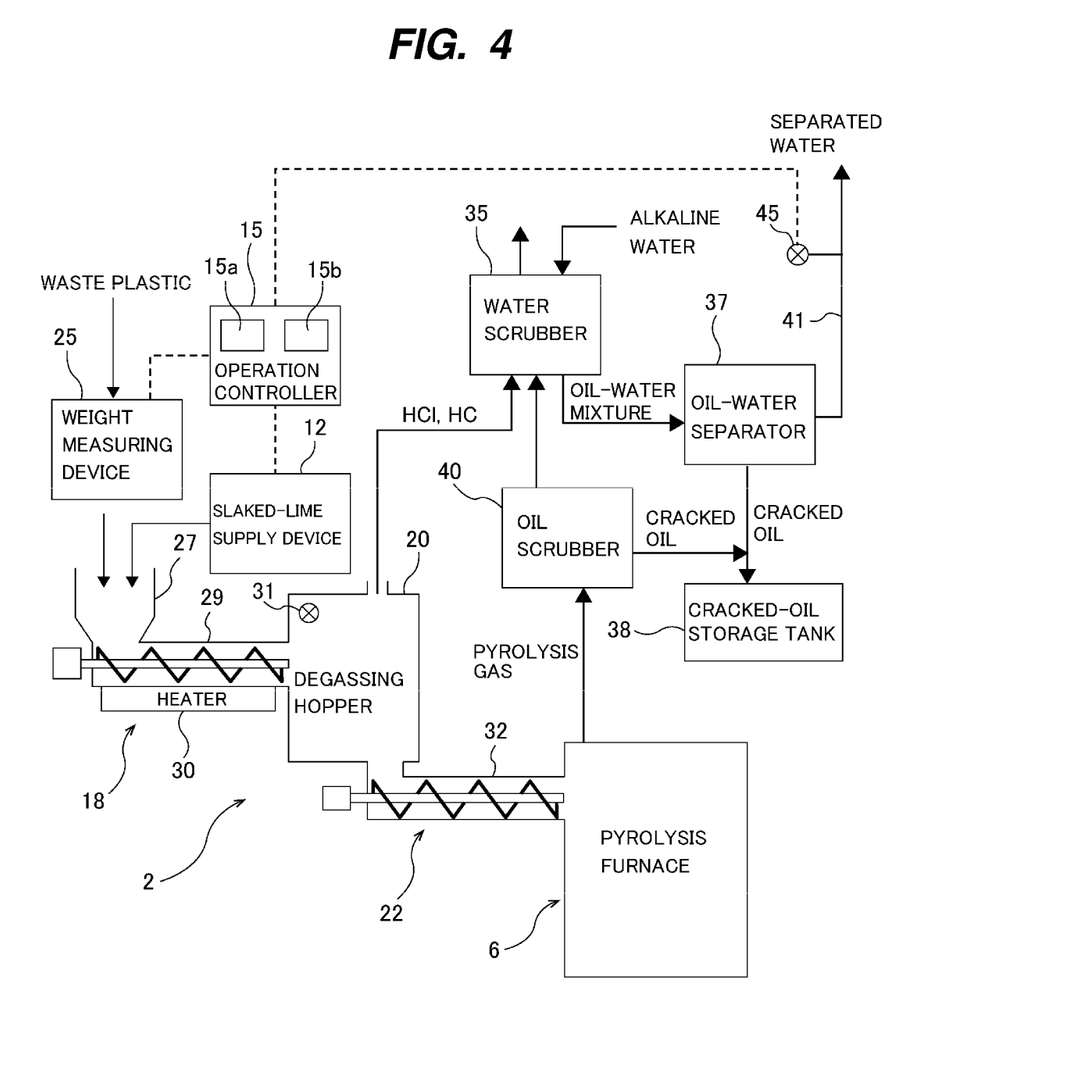
FIG. 4 is a schematic diagram illustrating yet another embodiment of a treatment system.

Specific examples of the cracked-oil characteristic measuring device 45 include a chlorine-concentration measuring device configured to measure the concentration of chlorine in the cracked oil, an acid-concentration measuring device configured to measure the concentration of acid in the cracked oil, a pH measuring device configured to measure the pH of the cracked oil, and a pH measuring device configured to measure the pH of water separated from the cracked oil. When the cracked-oil characteristic measuring device 45 is the pH measuring device that measures the pH of water separated from the cracked oil, the cracked-oil characteristic measuring device 45 is coupled to the separated-water discharge line 41 for discharging the water that has been separated from the cracked oil by the oil-water separator 37, as shown in FIG. 4.

The cracked-oil characteristic measuring device 45 may be at least one, or a combination of two or more of the chlorine-concentration measuring device that measures the concentration of chlorine in the cracked oil, the acid-concentration measuring device that measures the concentration of acid in the cracked oil, the pH measuring device that measures the pH of the cracked oil, and the pH measuring device that measure the pH of the water separated from the cracked oil.

The cracked-oil characteristic measuring device 45 is coupled to the operation controller 15, and the measured value of the characteristic of the cracked oil is sent to the operation controller 15. The operation controller 15 is configured to adjust (or determine) the amount of slaked lime to be fed to the waste plastic based on the measured value of the characteristic of the cracked oil, instead of the measured value of the weight of the waste plastic. When properties (or compositions) of the waste plastic change significantly, the ratio control may be performed based on the weight measurement value of the waste plastic, and during normal operation, the ratio control may be switched to the feedback control performed based on the measured value from the cracked-oil characteristic measuring device 45, so that the amount of slaked lime supplied is controlled.

As described above, in this embodiment, the amount of slaked lime to be fed to the waste plastic is automatically adjusted by the operation controller 15 based on the characteristic of the cracked oil (e.g., acid concentration, chlorine concentration, pH) contained in the pyrolysis gas discharged from the pyrolysis furnace 6. Therefore, based on the instruction from the operation controller 15, the slaked-lime supply device 12 can feed an amount of slaked lime that can appropriately treat both PVC and PET in the waste plastic into the waste plastic.

Figure 5:
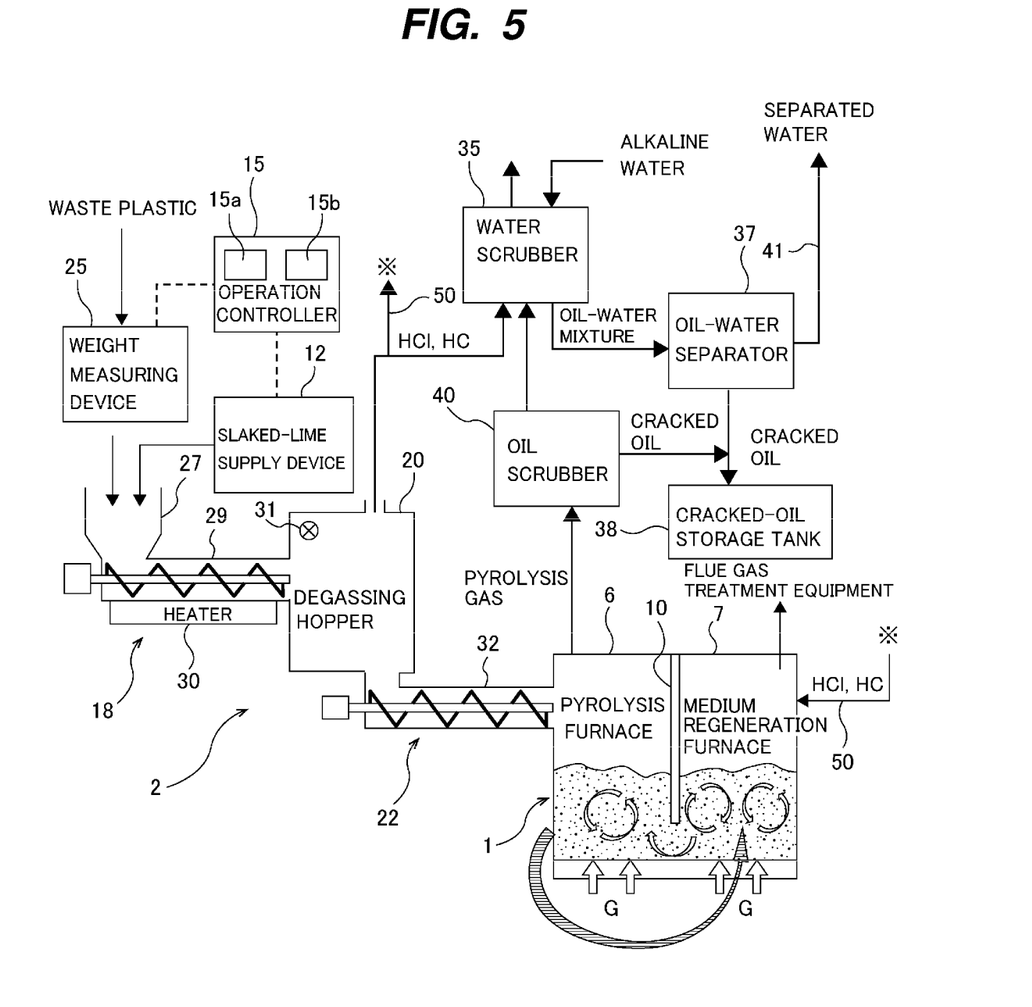
FIG. 5 is a schematic diagram illustrating an embodiment of a fluidized-bed treatment system for treating waste plastic.

FIG. 5 is a schematic diagram showing an embodiment of a treatment system for the waste plastic using a fluidized-bed furnace. Configurations and operations of this embodiment, which will not be particularly described, are the same as those of the embodiments described with reference to FIG. 1, and repetitive explanations thereof will be omitted.

In the embodiment shown in FIG. 5, a fluidized-bed furnace 1 having a pyrolysis furnace 6 and a medium regeneration furnace 7 is incorporated into the treatment system. Specifically, the treatment system of this embodiment includes the fluidized-bed furnace 1 and the raw-material supply system 2 configured to supply the waste plastic to the pyrolysis furnace 6 of the fluidized-bed furnace 1. The pyrolysis furnace 6 in the embodiment shown in FIG. 5 corresponds to the pyrolysis furnace 6 in the embodiment shown in FIG. 1.

The fluidized-bed furnace 1 includes the pyrolysis furnace 6 configured to pyrolyze the waste plastic and generate the pyrolysis gas containing pyrolysis products, such as hydrocarbon, and the medium regeneration furnace 7 configured to burn a residue of the pyrolyzed waste plastic. An interior of the fluidized-bed furnace 1 is partitioned by a partition wall 10 into the pyrolysis furnace 6 and the medium regeneration furnace 7.

An entire shape of the fluidized-bed furnace 1 is not particularly limited, and the fluidized-bed furnace 1 may have, e.g., a cylindrical shape or a rectangular shape. A fluidized medium (e.g., silica sand) is contained in the pyrolysis furnace 6 and the medium regeneration furnace 7. A fluidizing gas G is supplied into the pyrolysis furnace 6 and the medium regeneration furnace 7 in order to fluidize the fluidized medium. The raw-material supply system 2 is coupled to the pyrolysis furnace 6, so that the waste plastic is supplied into the pyrolysis furnace 6 by the raw-material supply system 2. The configurations of the raw-material supply system 2 are the same as those in the embodiment described with reference to FIG. 1.

While the fluidized medium circulates between the pyrolysis furnace 6 and the medium regeneration furnace 7, the waste plastic is fed into the pyrolysis furnace 6 by the raw-material supply system 2. The waste plastic is heated and pyrolyzed by the fluidized medium in the pyrolysis furnace 6. As a result of the pyrolysis, the waste plastic is transformed into the pyrolysis gas. The residue of the waste plastic is carried by the fluidized medium to the medium regeneration furnace 7, where the residue of the waste plastic is subjected to combustion treatment. The residue of the waste plastic is burned in the medium regeneration furnace 7 to heat the fluidized medium. A flue gas generated in the medium regeneration furnace 7 is delivered to a flue gas treatment device (not shown). The fluidized medium heated in the medium regeneration furnace 7 moves into the pyrolysis furnace 6 and functions as a heat source in the pyrolysis furnace 6. The fluidized-bed furnace 1 in which the fluidized medium circulates in the furnaces in this manner is called an internally circulating fluidized-bed gasification system.

The slaked lime that has been fed to the waste plastic by the raw-material supply system 2 is discharged from the medium regeneration furnace 7 after the following chemical reaction.

In the above formulas, PVC(HCl) represents hydrogen chloride derived from chlorine in PVC, TPA represents terephthalic acid, and TP-Ca represents calcium terephthalate.

In one embodiment, hydrocarbon gas containing HCl (hydrogen chloride) that has been generated in the degassing hopper 20 and was not fixed to the slaked lime may be fed into the medium regeneration furnace 7 through a hydrocarbon-gas transfer line 50. The hydrocarbon gas containing HCl is burned in the medium regeneration furnace 7, and HCl (hydrogen chloride) is neutralized and fixed in a flue gas treatment equipment disposed downstream of the medium regeneration furnace 7.

Figure 6:
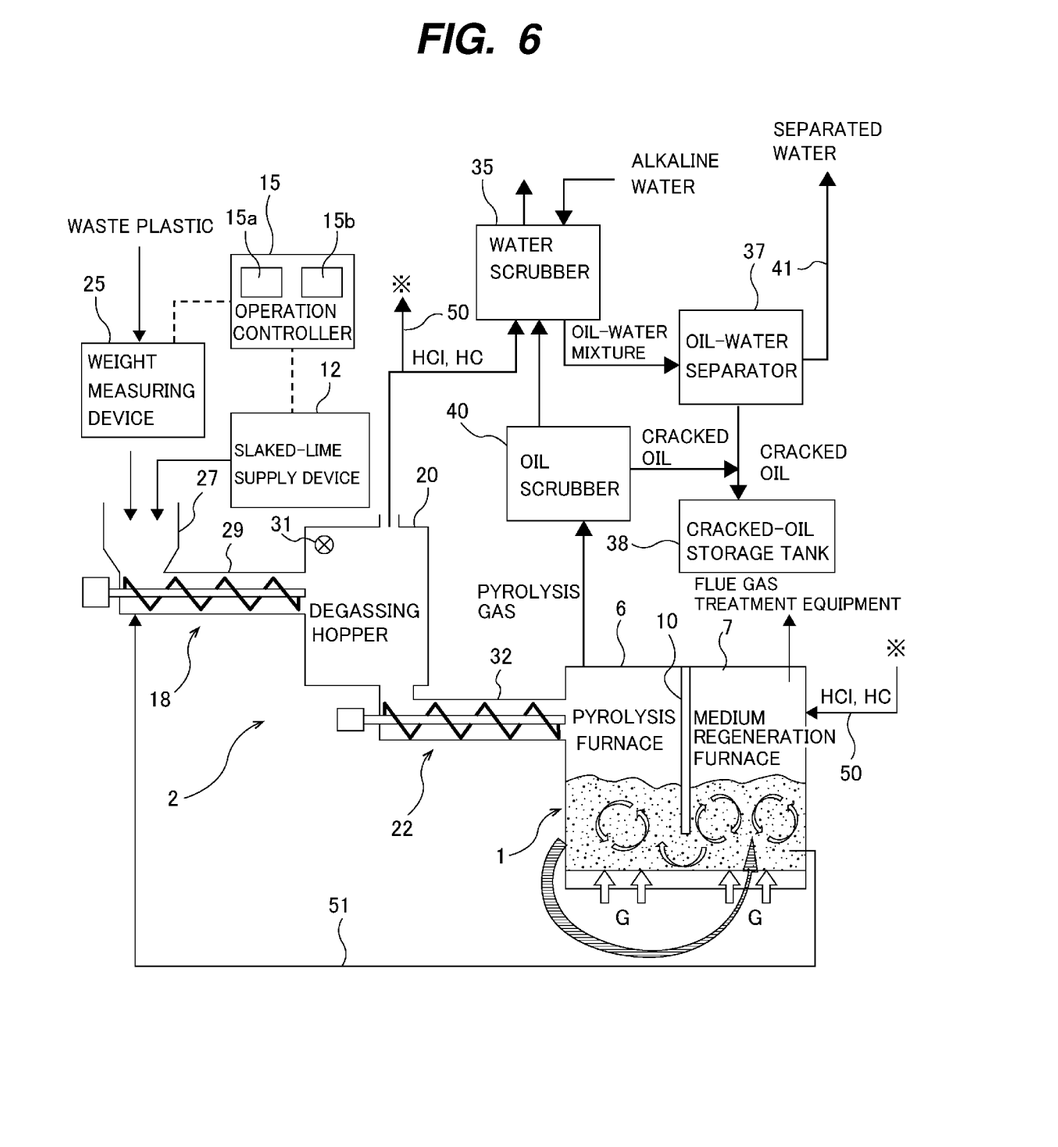
FIG. 6 is a schematic diagram illustrating another embodiment of a fluidized-bed treatment system for treating waste plastic.

The melting dechlorination device 18 is normally supplied with equal or more moles of slaked lime. Further, in the medium regeneration furnace 7, a part of Ca salt ($CaCl_2$) generated by the neutralization reaction is pyrolyzed. Thus, the fluidized medium heated in the medium regeneration furnace 7 may be used as the heat source of the melting dechlorination device 18. More specifically, as shown in FIG. 6, a part of the fluidized medium in the medium regeneration furnace 7 is delivered to the melting dechlorination device 18 through a fluidized-medium transfer line 51, and the melting dechlorination device 18 mixes the waste plastic, the slaked lime, and the fluidized medium, so that the fluid medium itself can be used as the heat source. According to this embodiment, the pyrolyzed Ca salt and the unreacted slaked lime contained in the fluidizing medium can be reused, so that the amount of slaked lime to be supplied can be reduced.

The embodiments described with reference to FIGS. 2 to 4 (including the arrangement and the configurations of the cracked-oil characteristic measuring device 45) can be applied to the embodiments described with reference to FIGS. 5 and 6, and the repetitive descriptions and depiction thereof are omitted.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a raw-material supply system and a raw-material supply method for pyrolyzing waste plastic containing polyvinyl chloride (PVC) and polyethylene terephthalate (PET), and in particular to a raw-material supply system and a raw-material supply method for supplying waste plastic to a pyrolysis furnace, while treating PVC and PET contained in the waste plastic.

REFERENCE SIGNS LIST 1 fluidized-bed furnace
2 raw-material supply system
6 pyrolysis furnace
7 medium regeneration furnace
10 partition wall
12 slaked-lime supply device
15 operation controller
18 melting dechlorination device
20 degassing hopper
22 raw-material supply device
25 weight measuring device
27 raw-material hopper
29 first raw-material feeder
30 heater
31 level sensor
32 second raw-material feeder
35 water scrubber
37 oil-water separator
38 cracked-oil storage tank
40 oil scrubber
41 separated-water discharge line
45 cracked-oil characteristic measuring device
50 hydrocarbon-gas transfer line
51 fluidized-medium transfer line

The invention claimed is:

1. A raw-material supply system for pyrolyzing waste plastic containing polyvinyl chloride and polyethylene terephthalate, the raw-material supply system comprising:
a slaked-lime ($Ca(OH)_2$) supply device configured to feed slaked lime to the waste plastic;
an operation controller configured to instruct the slaked-lime supply device to feed the slaked lime to the waste plastic, the slaked lime to be fed having a number of moles that is 1 to 4 times a total number of moles of the polyvinyl chloride and the polyethylene terephthalate in the waste plastic;
a melting dechlorination device configured to dechlorinate the polyvinyl chloride and hydrolyze the polyethylene terephthalate by mixing the waste plastic and the slaked lime while heating the waste plastic and the slaked lime;
a degassing hopper coupled to the melting dechlorination device and configured to store the waste plastic that has been melted by the melting dechlorination device; and
a raw-material supply device configured to deliver the molten waste plastic from the degassing hopper to a pyrolysis furnace,
wherein the pyrolysis furnace comprises a pyrolysis furnace of a fluidized-bed furnace,
the fluidized-bed furnace includes the pyrolysis furnace and a medium regeneration furnace containing a fluidized medium that circulates between the pyrolysis furnace and the medium regeneration furnace,
the raw-material supply system further comprises a fluidized-medium transfer line configured to deliver a part of the fluidized medium from the medium regeneration furnace to the melting dechlorination device, and
the part of the fluidized medium constitutes a heat source of the melting dechlorination device.

2. The raw-material supply system according to claim 1, further comprising a weight measuring device configured to measure a weight of the waste plastic before the slaked lime is fed to the waste plastic, the operation controller being configured to adjust an amount of the slaked lime to be fed to the waste plastic based on a measured value of the weight of the waste plastic.

3. The raw-material supply system according to claim 1, further comprising a cracked-oil characteristic measuring device configured to measure a characteristic of a cracked oil recovered from a pyrolysis gas discharged from the pyrolysis furnace, the operation controller being configured to adjust an amount of the slaked lime to be fed to the waste plastic based on a measured value of the characteristic of the cracked oil.

4. The raw-material supply system according to claim 3, wherein the cracked-oil characteristic measuring device is at least one of a chlorine-concentration measuring device configured to measure a concentration of chlorine in the cracked oil, an acid-concentration measuring device configured to measure a concentration of acid in the cracked oil, a pH measuring device configured to measure a pH of the cracked oil, and a pH measuring device configured to measure a pH of water separated from the cracked oil.

5. The raw-material supply system according to claim 1, further comprising a water scrubber configured to condense hydrocarbon vapor generated from the heated waste plastic to recover cracked oil, the water scrubber being coupled to the degassing hopper.

6. A raw-material supply method for pyrolyzing waste plastic containing polyvinyl chloride and polyethylene terephthalate, the method comprising:
  feeding slaked lime $(Ca(OH)_2)$ to the waste plastic, the slaked lime having a number of moles that is 1 to 4 times a total number of moles of the polyvinyl chloride and the polyethylene terephthalate in the waste plastic;
  mixing the waste plastic and the slaked lime while heating the waste plastic and the slaked lime in a melting dechlorination device to dechlorinate the polyvinyl chloride and hydrolyze the polyethylene terephthalate; and
  supplying the waste plastic that has been melted by being heated to a pyrolysis furnace,
  wherein the pyrolysis furnace comprises a pyrolysis furnace of a fluidized-bed furnace,
  the fluidized-bed furnace includes the pyrolysis furnace and a medium regeneration furnace containing a fluidized medium that circulates between the pyrolysis furnace and the medium regeneration furnace,
  a part of the fluidized medium is delivered from the medium regeneration furnace to the melting dechlorination device, and
  the part of the fluidized medium is used as a heat source of the melting dechlorination device.

7. The raw-material supply method according to claim 6, further comprising measuring a weight of the waste plastic before the slaked lime is fed to the waste plastic, an amount of the slaked lime to be fed to the waste plastic being adjusted based on a measured value of the weight of the waste plastic.

8. The raw-material supply method according to claim 6, further comprising measuring a characteristic of a cracked oil recovered from a pyrolysis gas discharged from the pyrolysis furnace, an amount of the slaked lime to be fed to the waste plastic being adjusted based on a measured value of the characteristic of the cracked oil.

9. The raw-material supply method according to claim 8, wherein the characteristic of the cracked oil is at least one of a concentration of chlorine in the cracked oil, a concentration of acid in the cracked oil, a pH of the cracked oil, and a pH of water separated from the cracked oil.

10. The raw-material supply method according to claim 6, further comprising condensing hydrocarbon vapor generated from the waste plastic heated in the melting dechlorination device by a water scrubber to recover cracked oil.

* * * * *